United States Patent [19]
Mizobuchi

[11] Patent Number: 6,023,843
[45] Date of Patent: Feb. 15, 2000

[54] METHOD OF FORMING AN ANNULAR MEMBER OF A TORQUE CONVERTER

[75] Inventor: Naoki Mizobuchi, Toyonaka, Japan

[73] Assignee: Exedy Corporation, Neyagawa, Japan

[21] Appl. No.: 09/022,048

[22] Filed: Feb. 11, 1998

[30] Foreign Application Priority Data

Feb. 13, 1997 [JP] Japan .................................. 9-029257

[51] Int. Cl.⁷ ................................................ B23P 15/00
[52] U.S. Cl. ............................................ 29/889.5; 29/557
[58] Field of Search .............................. 29/889.5, 889.1, 29/557; 192/3.28; 60/361

[56] References Cited

U.S. PATENT DOCUMENTS

| | | | |
|---|---|---|---|
| 2,061,997 | 11/1936 | Dunn | 29/889.5 |
| 2,360,383 | 10/1944 | Zeidler | 29/889.5 |
| 4,470,535 | 9/1984 | Motomura et al. | 29/889.5 |
| 5,384,958 | 1/1995 | O'Daniel et al. | 29/557 |
| 5,462,145 | 10/1995 | Gimmler | 29/889.5 |
| 5,522,220 | 6/1996 | Locker | 60/361 |
| 5,553,693 | 9/1996 | Schoder et al. | 192/3.28 |

FOREIGN PATENT DOCUMENTS

| | | | |
|---|---|---|---|
| 0010525 | 12/1955 | Germany | 29/889.5 |
| 0320789 | 5/1935 | Italy | 29/889.5 |
| 401283467 | 11/1989 | Japan | 29/889.5 |

*Primary Examiner*—Irene Cuda
*Attorney, Agent, or Firm*—Shinjyu An Intellectual Property Firm

[57] ABSTRACT

A method of forming a driven plate (20) of a torque converter (1) has first, second and third steps. In the first step, a flat plate member (10) is cut into a predetermined configuration. In the second step, the plate member (10) is wound to form an annular member 11 that has slightly overlapping ends with a predetermined length (t). In the third step, resistance welding is performed on overlapping ends of the annular member (11), and thereby the opposite end portions are joined together to form a continuous annular member (12).

4 Claims, 4 Drawing Sheets

METHOD OF FORMING AN ANNULAR MEMBER OF A TORQUE CONVERTER

BACKGROUND OF THE INVENTION

1. Field of the Invention

The present invention relates to a method of forming an annular member of a torque converter, and in particular to a method of forming the annular member by bending a flat plate material or blank into an annular shape.

2. Description of the Background Art

A torque converter is a device which includes three kinds of vane wheels (impeller, turbine and stator) and is operable to transmit a torque through a working fluid filling an interior thereof. The impeller is fixed to a front cover coupled to an input rotary member, and transmits a torque to an output member through the working fluid flowing from the impeller to the turbine. A lockup damper included in the torque converter is disposed between the turbine and the front cover, and is operable to mechanically couple the front cover and the turbine together and thereby transmit torque from the front cover directly to the output member. The lockup damper includes a piston to be pressed against the front cover, a retaining plate fixed to the piston, torsion springs carried by the retaining plate and a driven plate which is elastically coupled in the rotating direction to the piston through the torsion springs. The driven plate is fixed to the turbine coupled to the output rotary member.

The torque converter is a rotating mechanism, and many components thereof are formed with an annular shape. For example, a driven plate 20 shown in FIG. 1 is an annular member, and includes an annular fixing portion 20b, which has a form extending along the outer peripheral surface of the turbine 5, and a plurality of claws 20a extending from the fixing portion 20b toward an engine (not shown). In the prior art, the annular member is formed by deforming a circular plate, which is first prepared by cutting an annular blank and forming holes at an inner peripheral portion thereof.

However, the overall yield from raw materials used to produce such annular blanks are low if the driven plate 20 and other annular members are produced from annular blanks having an outer circumference that corresponds to the fixing portion 20b or the like, where such annular blanks are prepared by cutting an annular shaped blank from flat materials. In other words, cutting annular shaped blanks from flat raw materials is an inefficient use of materials because there is alot of waste or scrap material left over after cutting.

SUMMARY OF THE INVENTION

An object of the invention is to form an annular member of a torque converter from an elongated rectangular plate member by winding the plate member into an annular shape, and joining the ends together in a manner that reduces manufacturing steps and manufacturing costs, and wherein the annular member has good rotational balance.

In accordance with one aspect of the present invention, a method of forming an annular member of a torque converter has first, second and third steps. In the first step, a flat plate member is cut into a predetermined configuration. In the second step, the plate member is wound or deformed to form an annular shaped member, where ends of the annular shaped member overlap one another by a small predetermined length. In the third step, resistance welding is performed on overlapping ends of the annular member and thereby the opposite end portions are joined together to form a continuous annular member having a generally uniform thickness.

In this aspect, the opposite end portions of the annular member are overlapped together in the third step, and thereby a sufficient volume is ensured for melting by the resistance welding so that excessive reduction in thickness of the joined portions is suppressed. Thereby, a step of cutting off a buildup portion formed by welding can be eliminated, and also a sufficient welding strength can be kept. Since the resistance welding allows control of a heat supply in contrast to an ordinary welding, the welding and annealing can be performed at the same time, so that a conventional step dedicated to annealing is eliminated. Thereby, the number of manufacturing steps and the production cost can be reduced. An intended rotational balance can be kept with respect to the axis of the torque converter without requiring an additional working on the joined portions.

Preferably, the forming method further includes a fourth step. In the fourth step, the continuous annular member is pressed with a die to give it a conical shape.

If an arc welding were employed for joining the overlapping ends in the third step, buildup would result at the welding joint and a further manufacturing step would be required to remove the buildup in order to balance the member for subsequent use in a rotating torque convertor.

According to the above aspect, a buildup is not present owing predetermined length of the overlap and the use of the resistance welding for joining ends of the annular member which increases a manufacturing efficiency and production costs.

Preferably, the third step of the forming method of the present invention is such that a volume of the annular member reduced at the vicinity of the joined portions by the resistance welding is substantially equal to a volume corresponding to the size of the overlapped portion of the annular member.

Since the size of the overlapped ends of the annular member are predetermined, after welding the joined ends having a thickness that is generally equal to the thickness of remainder of the annular member.

Preferably, during the resistance welding step, annealing is effected on the joined portions of the annular member in the third step. Accordingly, heat supply during the resistance welding is controlled to perform simultaneously the welding for joining the opposite ends of the annular member and the annealing of the joined ends in the single step. Thereby, a conventional step dedicated to the annealing can be eliminated, and the production cost can be reduced owing to the reduction in number of the steps.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
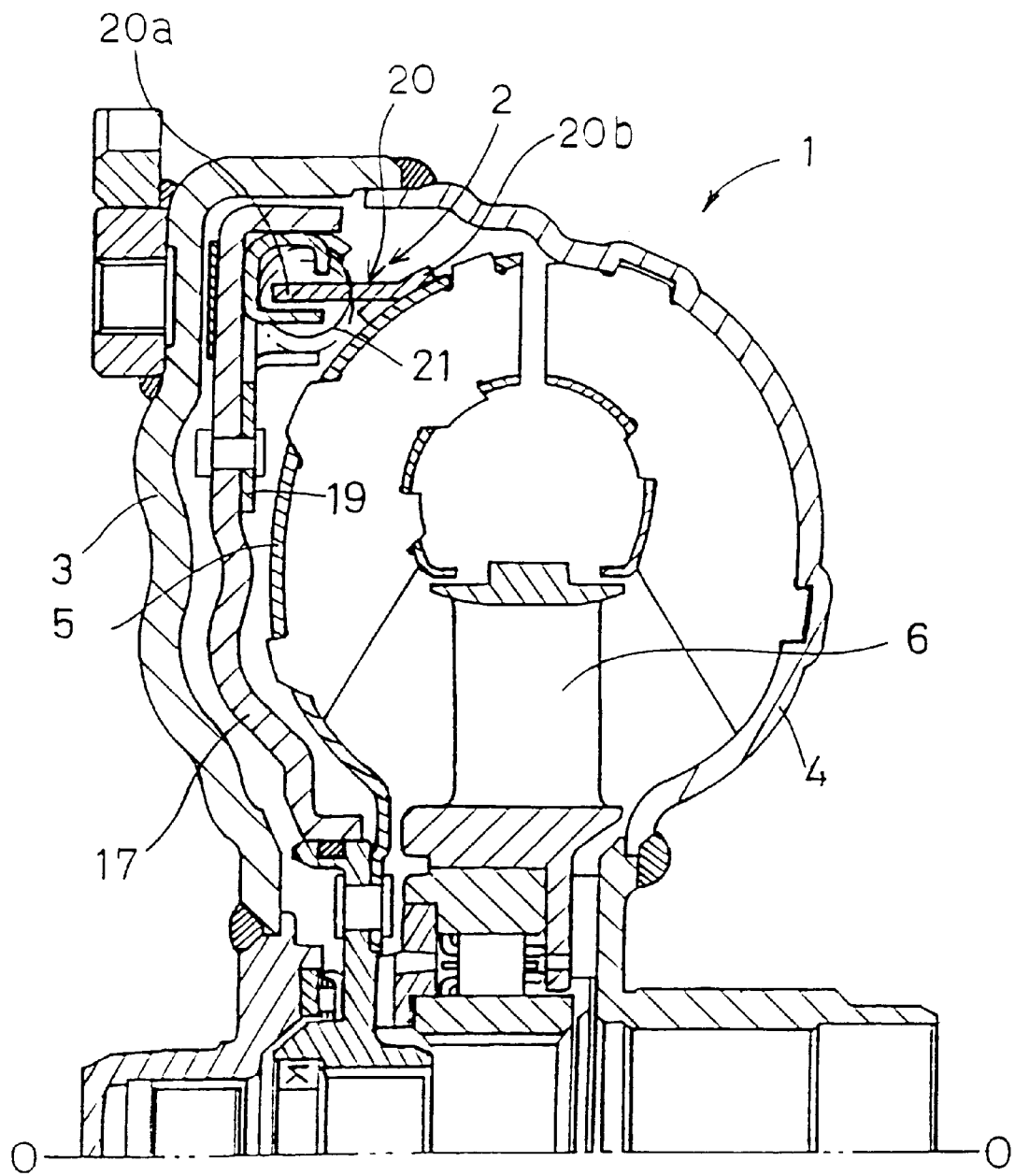
FIG. 1 is a schematic cross section of a torque converter including a driven plate which may be formed by a method in accordance with one embodiment of the invention.

FIG. 1 is a schematic cross section of a torque converter 1 including a driven plate 20, which is formed by a forming method in accordance with one embodiment of the invention. Although not shown, an engine (not shown) is arranged at a left position in FIG. 1, and a transmission (not shown) is arranged at a right position in FIG. 1.

The torque converter 1 is a mechanism for transmitting torque from a crankshaft of an engine to a main drive shaft of a transmission. The torque converter 1 is primarily formed with a front cover 3 which may be coupled to the crank shaft of the engine via a flexible plate, an impeller 4, a turbine 5 which may be coupled to the main drive shaft of the transmission, a stator 6 and a lockup clutch 2.

The lockup clutch 2 is disposed axially between the front cover 3 and the turbine 5. The lockup clutch 2 is primarily formed of a piston 17, a retaining plate 19, a driven plate 20 and torsion springs 21.

Figure 7:
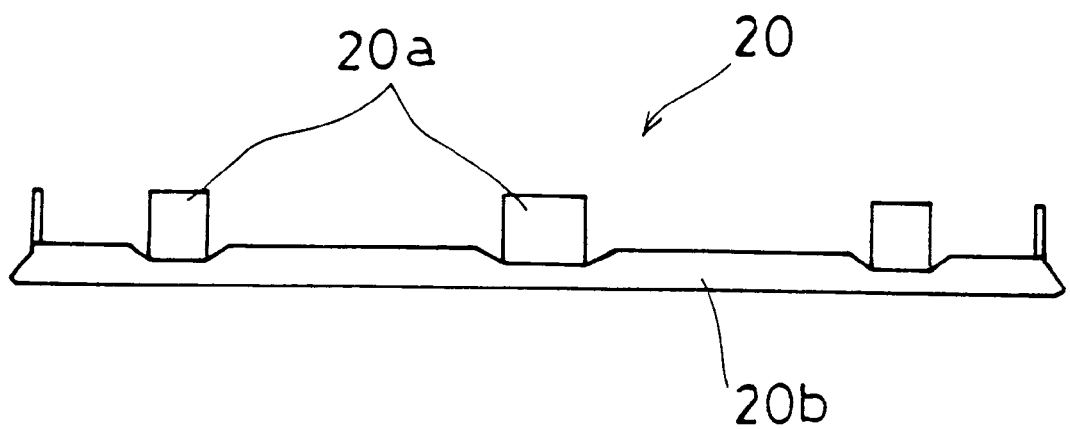
FIG. 7 is a side view of a driven plate produced from the annular member depicted in FIG. 6.

The driven plate 20 has a ring-like form as shown in FIGS. 1 and 7, and has a fixing portion 20b fixed to a side of the turbine 5 opposed to the engine, and also has a plurality of bent claws 20a engaged with circumferentially opposite ends of the torsion springs 21.

A method of manufacturing the driven plate 20 is described below.

Figure 2:
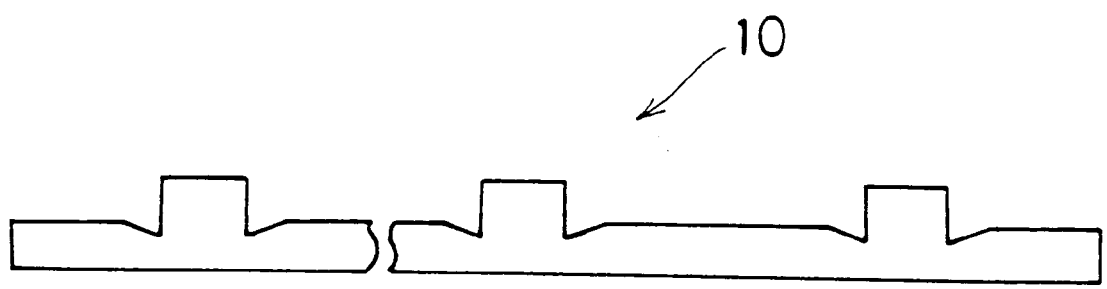
FIG. 2 is a fragmentary side view of an elongated plate which is cut into a shape in accordance with the method of the present invention.
Figure 3:
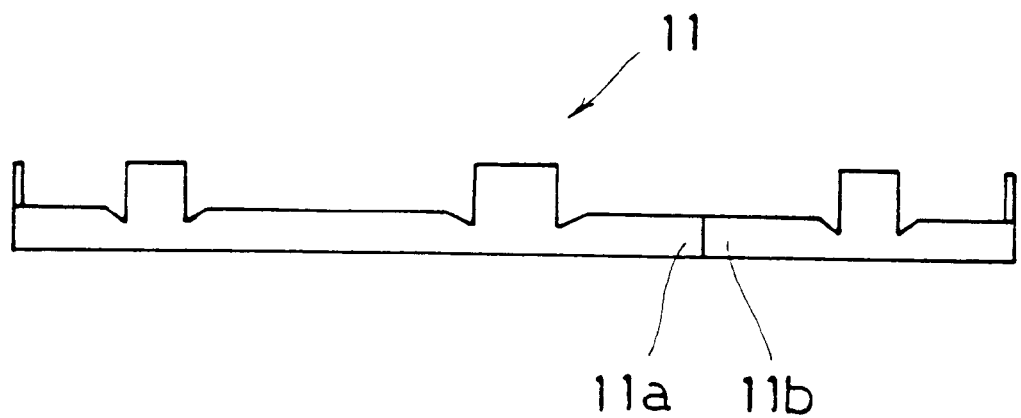
FIG. 3 is a side view of an annular member formed by winding the plate member depicted in FIG. 2 into an annular shape in accordance with the method of the present invention.

In a first step, a flat plate material is cut to form a plate 10 having a configuration shown in FIG. 2. In a second step, the cut plate 10 is wound into an annular form to form an annular member 11 shown in FIG. 3 such that a very small portion of each end of the cut plate 10 overlap one another by a length t, shown in FIG. 4.

Figure 4:
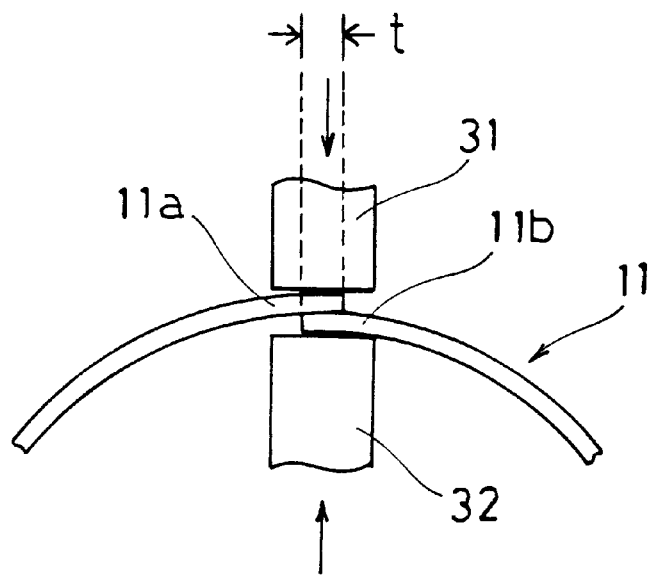
FIG. 4 is a fragmentary bottom view of the annular member depicted in FIG. 3 wherein ends of the plate member are joined together in accordance with the present invention.
Figure 5:
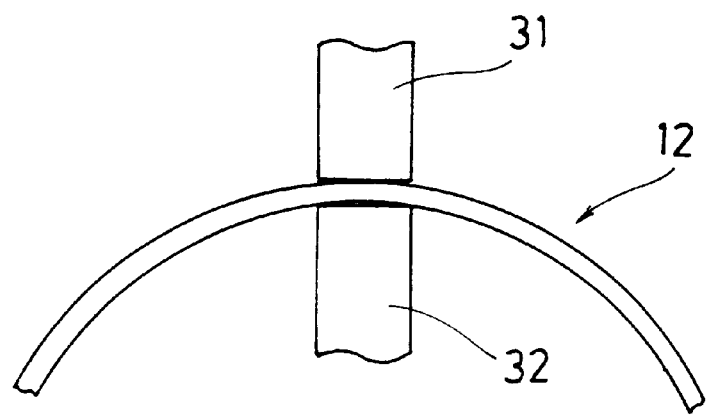
FIG. 5 is a fragmentary bottom view of the annular member depicted in FIG. 4 after joining of the ends of the plate member in accordance with the present invention.
Figure 6:
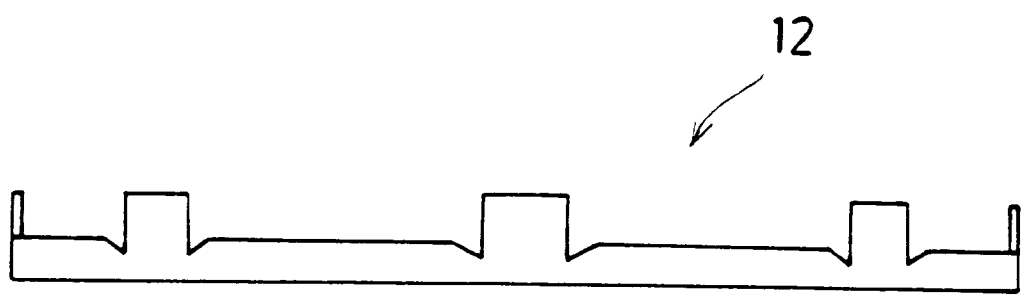
FIG. 6 is a side view of the annular member depicted in FIG. 5.

In a third step, the end portions 11a and 11b of the annular member 11 which are overlapped by predetermined length t, as shown in FIG. 4, are joined together by resistance welding to form a continuous annular member 12 as shown in FIGS. 5 and 6. In this third step, a voltage is applied to the overlapped end portions 11a and 11b of the annular member 11 from clamps 31 and 32 which serve as electrodes and apply to the end portions 11a and 11b an appropriate mechanical load in a direction indicated by arrows in FIG. 4. By applying the appropriate load, the end portions 11a and 11b joined together by the welding can have a thickness substantially equal to the thickness of the portion other than the welded portions. In this process, the overlapping size, i.e., the length t of the overlapped region is predetermined such that the thickness of the annular member before welding remains the same after the welding. Thus, a volume corresponding to the overlapping size of the annular member 11 is set to be equal to a volume of the annular member 11 near the joined regions, which is reduced by the resistance welding. Thereby, a volume of the end portions which will be melted by the welding can be reserved, and reduction in thickness of the joined portions is suppressed. Further, by the above predetermination of the length t of the overlap and subsequent resistance welding, it is possible to eliminate the step of cutting off buildup of welding material normally associated with, for instance, arc welding. It is also possible to maintain a sufficient welding strength by the above process. In the third step, the opposite end portions 11a and 11b are joined together and, at the same time, the heat supply, i.e., the voltage and the time are controlled to anneal the joined portions of the continuous annular member 12. This improves the workability of the continuous annular member 12, and therefore facilitates the press working in the fourth step below.

In the fourth step, the continuous annular member 12 is pressed (deformed slightly) into the shape of the driven plate 20 shown in FIG. 7. In this process, the fixing portion 20b of the driven plate 20 is pressed into a conical shape for subsequent engagement with the turbine 5 of FIG. 1, and the claws 20a are inclined with respect to the fixing portion 20b.

As described above, it is not the arc welding but the resistance welding that is employed for joining the ends and thereby manufacturing the driven plate 20. Using resistance welding also offers another advantage. In a stage for adjusting a rotational balance with respect to the axis of the torque converter 1, rotational balance can be achieved to a certain extent without additional manufacturing steps on the joined portions, because no appreciable amounts of buildup are formed at the joined portions in contrast to the process employing the arc welding.

If the arc welding were employed for joining the end portions in the third step, the buildup portion at the welded portions would have to be removed or counteracted somehow by adding weights in the process of adjusting the rotational balance if the buildup remains at the joined portions. Therefore, it would be necessary to employ a die for the press working provided with a concavity corresponding to the joined portions of the annular member, and positioning of the joined portions would be required when setting the work. Further, it would be difficult to obtain a good balance due to the presence of the buildup portion at the welded portions, and the steps for adjusting the final balance would increase in number. In contrast to the above, the buildup is not formed according to the method of manufacturing the driven plate 20 of the embodiment owing to employment of the resistance welding for forming the annular member 11, so that positioning of the joined portions is not required, which improves the work efficiency and lowers the production cost.

According to the invention, the annular member of the torque converter is produced from the wound plate member or blank in such a manner that the opposite end portions of the plate are overlapped together to provide a volume for melting during the resistance welding. This suppresses reduction in thickness of the joined portions as a result of welding, so that the working for removing the buildup portion, which would be formed if the arc welding were employed, can be eliminated, and an intended welding strength can be maintained. Since the resistance welding which allows control of the heat supply is employed for joining, the joining and the annealing can be performed at the same time. This eliminates any increase in number of manufacturing steps, and reduces the overall production cost. As described above, the number of steps and the production cost can be reduced, and an intended rotational balance with respect to the axis of the torque converter can be achieved to a certain extent without performing an additional working on the joined portions.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A method of forming an annular member of a torque converter comprising:
    a first step of cutting a flat plate member into a configuration such that after cutting the plate member has an elongated rectangular shape with a plurality of tab portions cut there on;
    a second step of winding the plate member such that the plate member is deformed to have a generally annular shape forming an annular member where ends of the plate member slightly overlap one another in formation of the annular member; and
    a third step of performing resistance welding the overlapping ends of the annular member thereby joining the overlapping ends together to form a continuous annular member.

2. The forming method according to claim 1, further comprising a fourth step of effecting a press working on the continuous annular member with a die to provide a conical shape to the continuous annular member.

3. The forming method according to claim 1, wherein the resistance welding in said third step is performed such that a volume of the annular member reduced in the vicinity of the joined portions by the resistance welding is substantially equal to a volume corresponding to the size of the overlapped portion of the annular member.

4. The forming method according to claim 1, wherein the resistance welding is effected to join the opposite end portions of the annular member and annealing is effected on the joined portions of the annular member in said third step.

* * * * *